May 12, 1970

J. SWITHENBANK ET AL 3,511,054

METHOD OF ROCKET PROPULSION USING AUXILIARY GAS STREAM
TO STABILIZE IRREGULAR BURNING

Filed April 17, 1967

INVENTORS
JOSHUA SWITHENBANK
GEORGE FRED PARKHURST TRUBRIDGE

BY Cushman, Darby & Cushman
ATTORNEYS

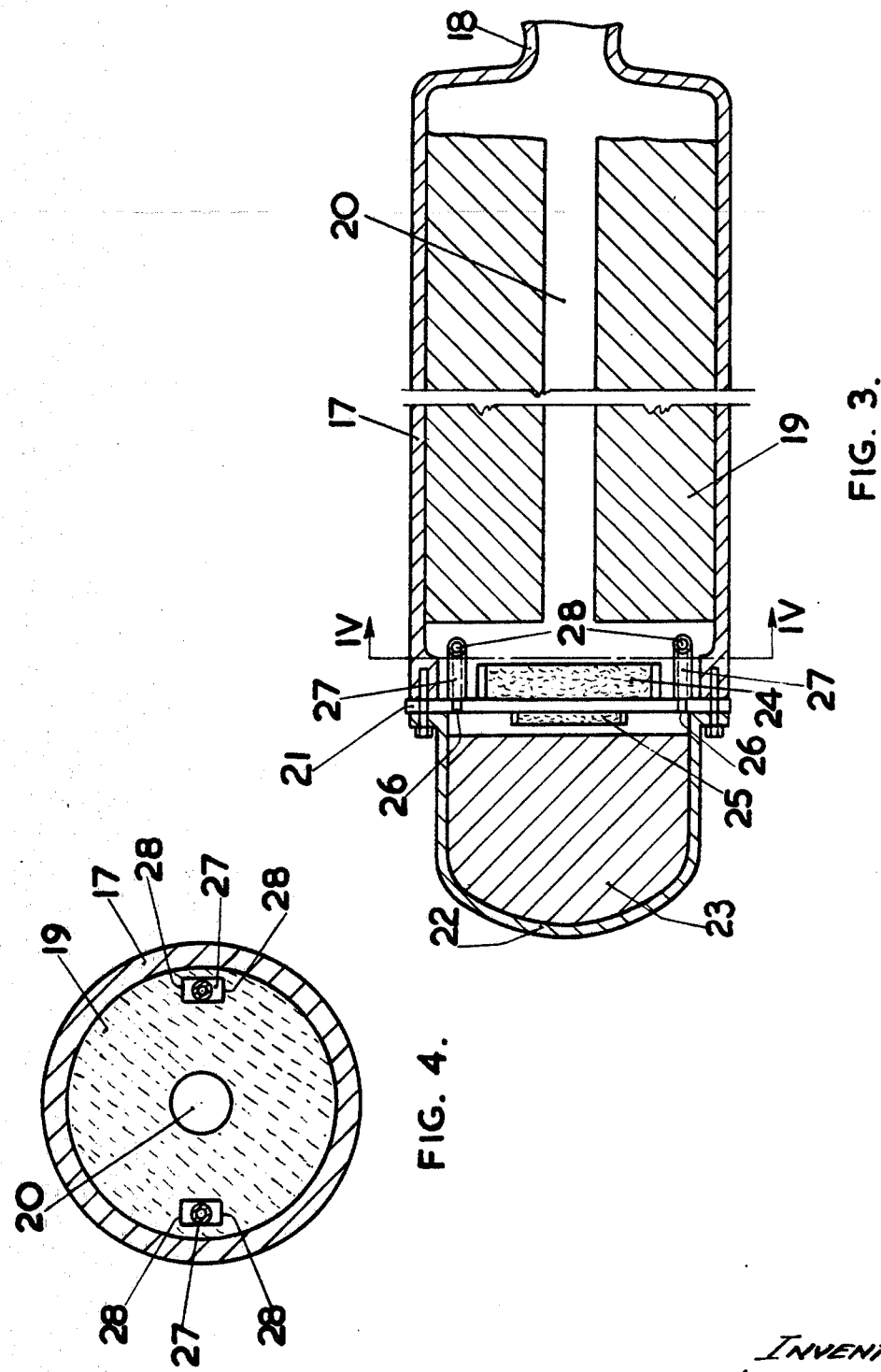

INVENTORS
JOSHUA SWITHENBANK
GEORGE FRED PARKHURST TRUBRIDGE
BY
Cushman, Darby & Cushman
ATTORNEYS United States Patent Office 3,511,054
Patented May 12, 1970

3,511,054
METHOD OF ROCKET PROPULSION USING AUXILIARY GAS STREAM TO STABILIZE IRREGULAR BURNING
Joshua Swithenbank, Hathersage, George Fred Parkhurst Trubridge, Droitwich Spa, England; said George F. P. Trubridge assignor to Imperial Metal Industries (Kynoch) Limited, Birmingham, England, a corporation of Great Britain
Filed Apr. 17, 1967, Ser. No. 631,451
Claims priority, application Great Britain, Apr. 20, 1966, 17,317/66
Int. Cl. F23r 1/14
U.S. Cl. 60—220    7 Claims

ABSTRACT OF THE DISCLOSURE

A rocket motor having a propellant combustion chamber which is characterized in an even number of gas injector means equiangularly spaced around a circle in and concentric with a combustion chamber upstream of the combustion volume, each injector having two orifices to discharge opposed auxiliary gas streams tangential to the circle.

BACKGROUND OF THE INVENTION

The present invention relates to rocket motors incorporating devices for stabilizing irregular burning during combustion of the rocket propellant, and also to methods of stabilizing irregular burning in rocket motors.

Variations in the burning rate of rocket motor propellants, particularly solid propellants but also liquid propellants, cause deviations in pressure at the rocket nozzle, which usually amount to $\pm 5\%$ of the design operating pressure, but under extreme conditions pressures far greater than the design operating pressure can occur. This phenomenon is known as irregular burning which usually consists of two forms of oscillation, a longitudinal oscillation and a circular oscillation of which both are accompanied by vortices. The production of a vortex often has serious consequences with solid propellants in irregularly eroding the burning face of the propellant and may eventually rupture the rocket casing. In addition, the creation of a vortex at the rocket nozzle can adversely influence the directional stability of the rocket. Furthermore, the vibrations associated with the oscillations can disturb devices located in the head of the rocket.

Resonance rods have been used to stabilize the combustion, but one disadvantage in this method of stabilizing the combustion is that the resonance rods increase the weight of the rocket motor; a further disadvantage with this method when applied to solid propellant rocket motors is that, as the central conduit through the propellant becomes larger during combustion, the resonance rods become less effective in stabilizing the combustion.

SUMMARY OF THE INVENTION

In accordance with the invention a rocket motor comprises a propellant combustion chamber and is characterized in an even number of gas injector means equi-angularly spaced around a circle which is in and is concentric with the combustion chamber and which is upstream of the volume in which combustion takes place, each gas injector means having two orifices facing away from one another and arranged to discharge opposed auxiliary gas streams tangential to said circle.

Preferably the gas injector means are located close to the circumference of the combustion chamber.

In accordance with the invention also a method of stabilizing irregular burning in the combustion chamber of a rocket motor is characterized in discharging, from the orifices of an even number of gas injector means, an even number of pairs of opposed auxiliary gas streams tangential to a circle which is in and is concentric with the combustion chamber and which is upstream of the volume in which combustion takes place.

The invention is particularly useful in conjunction with solid propellant grains designed for radial burning.

Two or four gas injector means are located next to the wall of the combustion chamber but a larger number of these may be used successfully provided the number is even. The arrangement in the embodiment using two gas injector means in such that there are four gas streams and successive gas streams move in opposite directions around the circumference of the chamber. The number of reversals of velocity is greater for arrangements using more than two gas injector means. The result is that a multiple swirling movement of the auxiliary gas introduced through the injector means is produced upstream of the propellant combustion chamber and this serves to counteract the irregular burning. This is thought to be achieved because the auxiliary gas streams reduce the stability of the standing tangential mode of pressure and velocity oscillations in the combustion chamber, with respect to the travelling tangential mode. Thus the standing mode increases at the expense of the travelling mode. Consequently the vortexing effect and resultant irregular burning associated with the travelling mode are significantly reduced. However, the non-linear properties of the standing mode are such that, despite the increased instability of this mode, its amplitude is limited to practically negligible proportions.

The total gas flow rate for the auxiliary gas streams is desirably in the range 1–5%, preferably 2–4%, of the total flow rate from the rocket motor. The auxiliary gas streams can be derived from a variety of different sources. They may be produced by sources entirely separate from the main rocket propellant. In one particular construction, the gas injector means are mounted on the rocket head plate and are supplied with gas by the combustion of an auxiliary gas generator propellant provided on the opposite side of the head plate from the main rocket propellant. A separate reservoir of gas, e.g. a supply of nitrogen or oxygen, provides the auxiliary gas in a second particular construction. An advantage of the construction using separate sources of gas is that the output of gas from these sources supplements the gas produced by the combustion of the main propellant. Gas withdrawn from the main exhaust gas flow produced by the combustion of the main rocket propellant is circulated back through the rocket in a third particular construction and is reintroduced through the gas injector means upstream of the propellant.

The auxiliary gas streams should only be initiated after the propellant has been ignited as the introduction of gas before ignition might disturb the functioning of the igniter. It has, however, been found desirable to initiate the gas streams immediately after ignition of the propellant in order to achieve the optimum effectiveness in stabilizing the irregular burning.

BRIEF DESCRIPTION OF THE DRAWINGS

Preferred embodiments of the invention will now be more particularly described by way of example only with reference to the accompanying drawings, in which:

FIG. 3 is a longitudinal section view of the ends of a rocket motor;

FIG. 4 is a sectional view taken along the line IV–IV of FIG. 3; and

DESCRIPTION OF THE PREFERRED EMBODIMENTS

Figure 1:
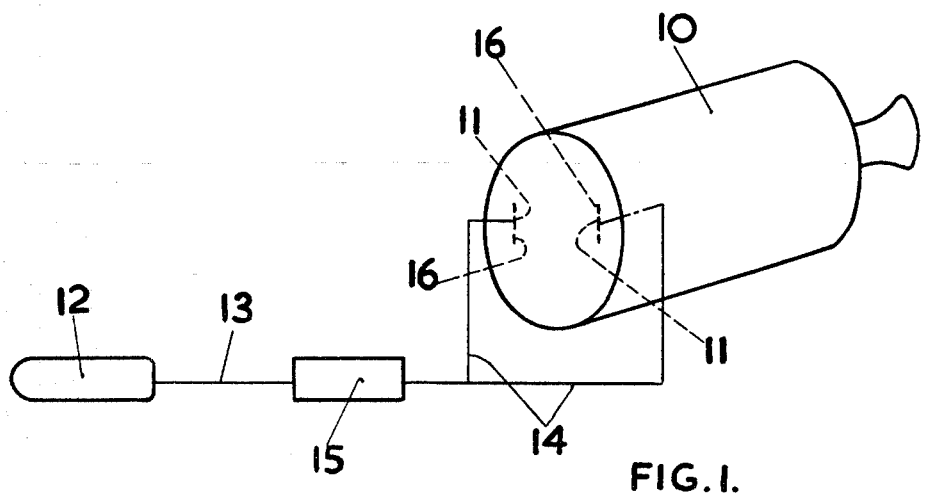
FIG. 1 illustrates schematically a ground test rocket motor provided with a separate gas source for auxiliary gas streams.
Figure 2:
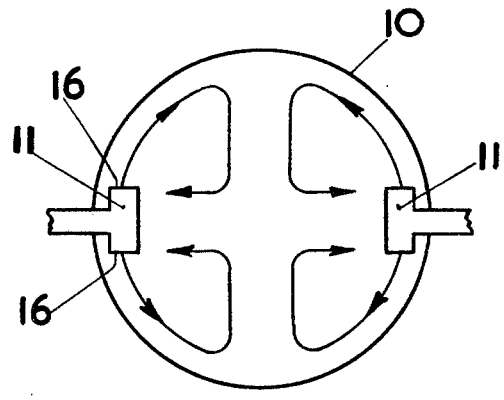
FIG. 2 is a diagrammatic cross-sectional view taken through the gas jets shown in the motor illustrated in FIG. 1.

FIG. 1 shows diagrammatically a rocket motor 10 provided with two gas injector means consisting of T-shaped jets 11 arranged to discharge gas through orifices 16 one at each end of the horizontal part of each T member. A nitrogen cylinder 12 is connected to the jets 11 via feed pipes 13 and 14 and a solenoid valve 15. The pressure of the nitrogen is maintained at 2000 p.s.i. during operation and its flow is 4% of the total flow rate from the rocket motor 10. FIG. 2 indicates the path, by means of arrowed lines, which is followed by the streams of gas after discharge from the jets 11.

Although the embodiment briefly described with reference to FIGS. 1 and 2 consists of a ground test motor it will be readily apparent to those skilled in the art that in a flight construction a source of nitrogen and the associated feed pipes and valve may be housed inside the head of the rocket. It will also be appreciated that other gases, such as oxygen, may be used instead of nitrogen for the auxiliary gas streams.

A further preferred embodiment shown in FIGS. 3 and 4 comprises a rocket chamber 17 with a discharge nozzle 18. The chamber 17 houses a main solid propellant 19 which is provided with a central conduit 20 and is designed for radial burning. A head plate 21 is secured to the case with a gas-tight fit at the upstream end of the chamber 17, and a head case 22 containing an auxiliary gas-generating propellant 23 is secured against the head plate 21, also in a gas-tight fit. A black powder main propellant igniter 24 is provided on the side of the head plate 21 facing the main propellant 19 for igniting the propellant 19 and a gas-generating propellant igniter 25, also of black powder, is provided on the opposite side of the head plate 21 for igniting the gas-generating propellant. Other ignition means (e.g. pyrogen or hypergolic) would be equally applicable. Two apertures 26 in the head plate 21 each communicate with a corresponding one of two gas injector means each consisting of a T-shaped jet 27 arranged to discharge auxiliary gas streams through orifices 28 at each end of the horizontal part of the T of the jet 27.

During operation the main propellant 19 and the gas-generating propellant 23 are ignited in the normal way by means of match-head initiation of the igniters 24 and 25. Gas produced by the gas-generating propellant 23 is expelled under pressure from the head case 22 through the apertures 26 and is discharged through each of the T-shaped jets into the chamber 17 in a region upstream of the main propellant 19 where it produces multiple vortices and counteracts any tendencies to irregular burning. The total gas flow through the orifices 28 is about 4% of the total flow rate through the discharge nozzle 18.

FIGS. 5 to 8 show graphs illustrating the pressure conditions plotted in p.s.i. as abscissae against time in seconds as ordinates for a 6″ diameter research rocket motor having two T-shaped jets fitted at the head end, which produce four vortices. A slotted radial cast double-base charge was used. When required, nitrogen was injected from the T-shaped jets at a flow rate of about 4% of the total rocket motor exhaust flow. The chamber pressure is plotted as a continuous line, the nitrogen as a dashed line, and a dot and dash line is used where the full and dashed lines are coincident.

Figure 5:
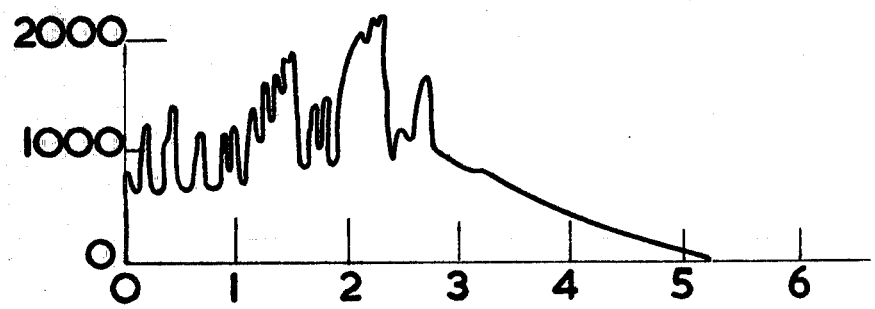
FIGS. 5 to 8 show graphs of pressure conditions in a rocket motor plotted as abscissae against time as ordinates.
Figure 6:
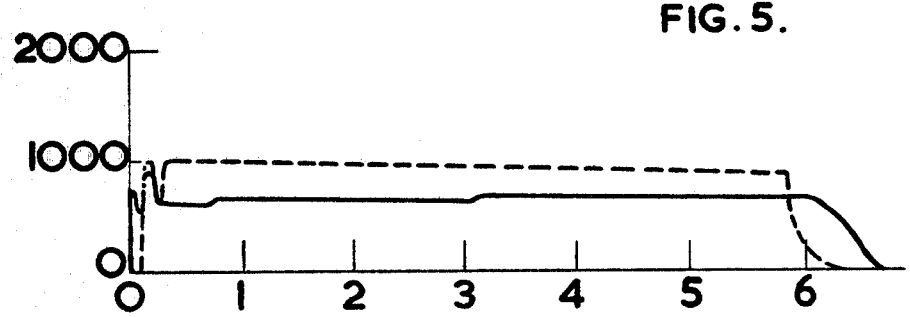

FIG. 5 shows the typical low frequency pressure record of chamber pressure with no nitrogen injection through the T-shaped jets. Film records and radial differential pressure measurements have shown that the severe pressure peaks can be associated with the formation of single vortices in the rocket motor. FIG. 6 shows the effect of beginning injection of nitrogen through the T-shaped jets immediately after ignition at about 1000 p.s.i. The low frequency pressure record shows that irregular burning was completely eliminated (except for a small peak as the jets were turned on). This result has been repeated on many firings. It has been found necessary to turn on the nitrogen after ignition as the introduction of nitrogen before ignition would blow the main propellant igniter out through the nozzle.

Figure 7:
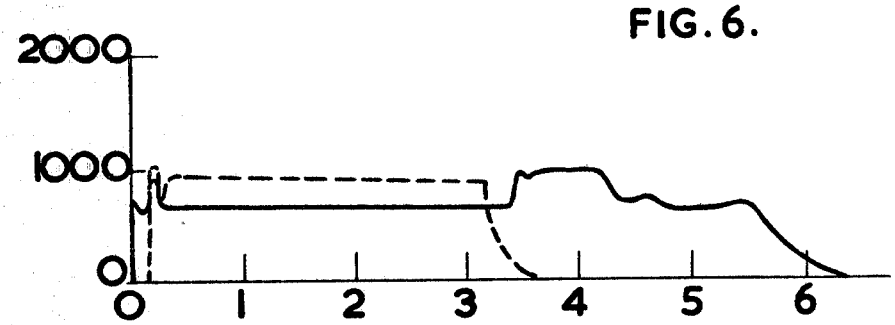

If the nitrogen is turned off half way through the firing, the rocket reverts to its usual irregular burning habits as shown in FIG. 7. A single vortex is responsible for the irregular burning.

Figure 8:
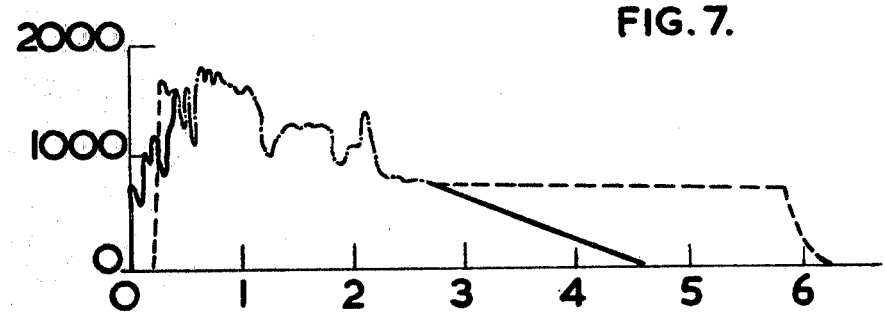

FIG. 8 shows the effect of delaying the nitrogen injection until after the spontaneous instability has commenced. It is apparent that the irregular burning cannot then be so effectively stabilized. Therefore, for best results, it is important to turn on the nitrogen before the motor goes unstable.

It has been demonstrated in other tests that oxygen is equally as effective as nitrogen in stabilizing combustion.

When the propellant jets in a liquid rocket are deflated by a cross flow, the resultant non-linear mixing and combustion causes a decrease in the stability of the appropriate mode analogous to the effect in a solid propellant rocket motor. Thus the invention is also applicable to liquid propellant rocket motors.

We claim:

1. A method of stabilizing irregular burning in the combustion chamber of a rocket motor characterized in discharging, from the orifices of an even number of gas injector means, an even number of pairs of opposed auxiliary gas streams tangential to a circle which is in and is concentric with the combustion chamber and which is upstream of the volume in which the combustion takes place.

2. A method according to claim 1 wherein the total gas flow rate for the auxiliary gas streams is in the range 1–5% of the total flow rate from the rocket motor.

3. A method according to claim 2 wherein the total gas flow rate for the auxiliary gas streams is in the range 2–4% of the total flow rate from the rocket motor.

4. A method according to claim 1 wherein the pressure of the auxiliary gas streams is maintained at about 2000 p.s.i. during operation.

5. A method according to claim 1 wherein the pressure of the auxiliary gas streams is maintained at about 1000 p.s.i. during operation.

6. A method according to claim 5 wherein the motor has a solid main propellant, there is provided an auxiliary gas generator, and the gas generator and main propellant are ignited by the match-head initiation of respective black powder igniters.

7. A method according to claim 6 wherein the gas generator is ignited after ignition of the main propellant but before the motor goes unstable.

References Cited

UNITED STATES PATENTS

| | | | |
|---|---|---|---|
| 3,065,596 | 11/1962 | Schultz | 60—207 |
| 3,068,641 | 12/1962 | Fox | 60—207 |
| 3,083,527 | 4/1963 | Fox | 60—207 |
| 3,151,445 | 10/1964 | Bauman | 60—219 XR |
| 3,234,729 | 2/1966 | Altman et al. | 60—220 |

BENJAMIN R. PADGETT, Primary Examiner

U.S. Cl. X.R.

60—207, 219